May 31, 1966  W. H. GOODING  3,253,695
SCREW CONVEYOR
Filed Feb. 28, 1964  2 Sheets-Sheet 1
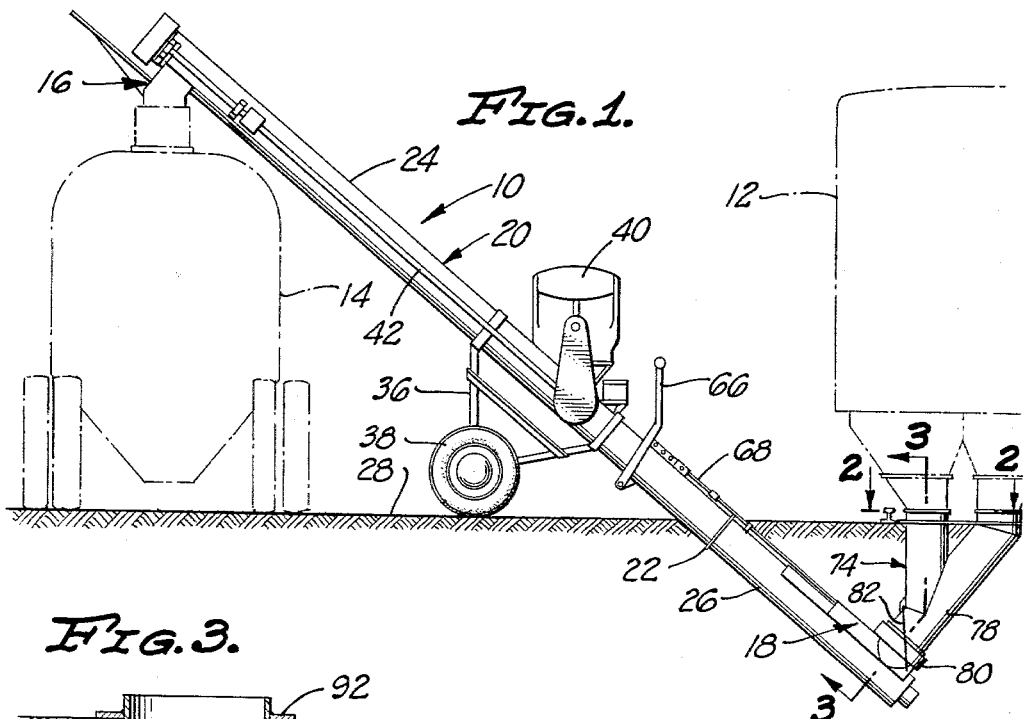
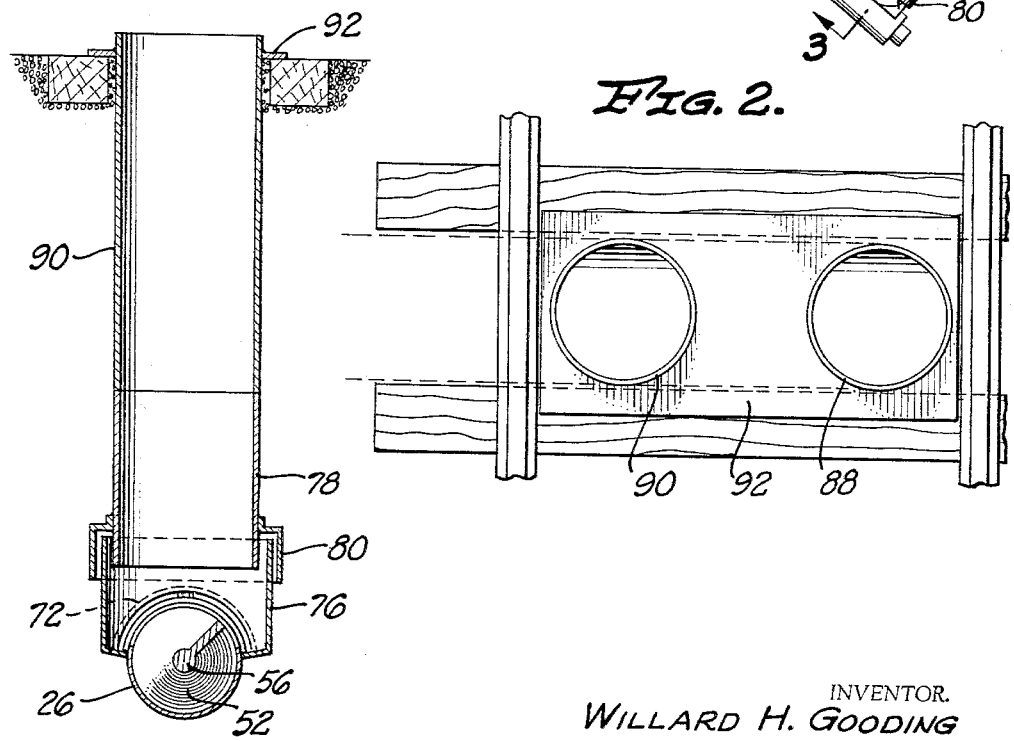
INVENTOR.
WILLARD H. GOODING
BY
EDWARD D. O'BRIAN
ATTORNEY

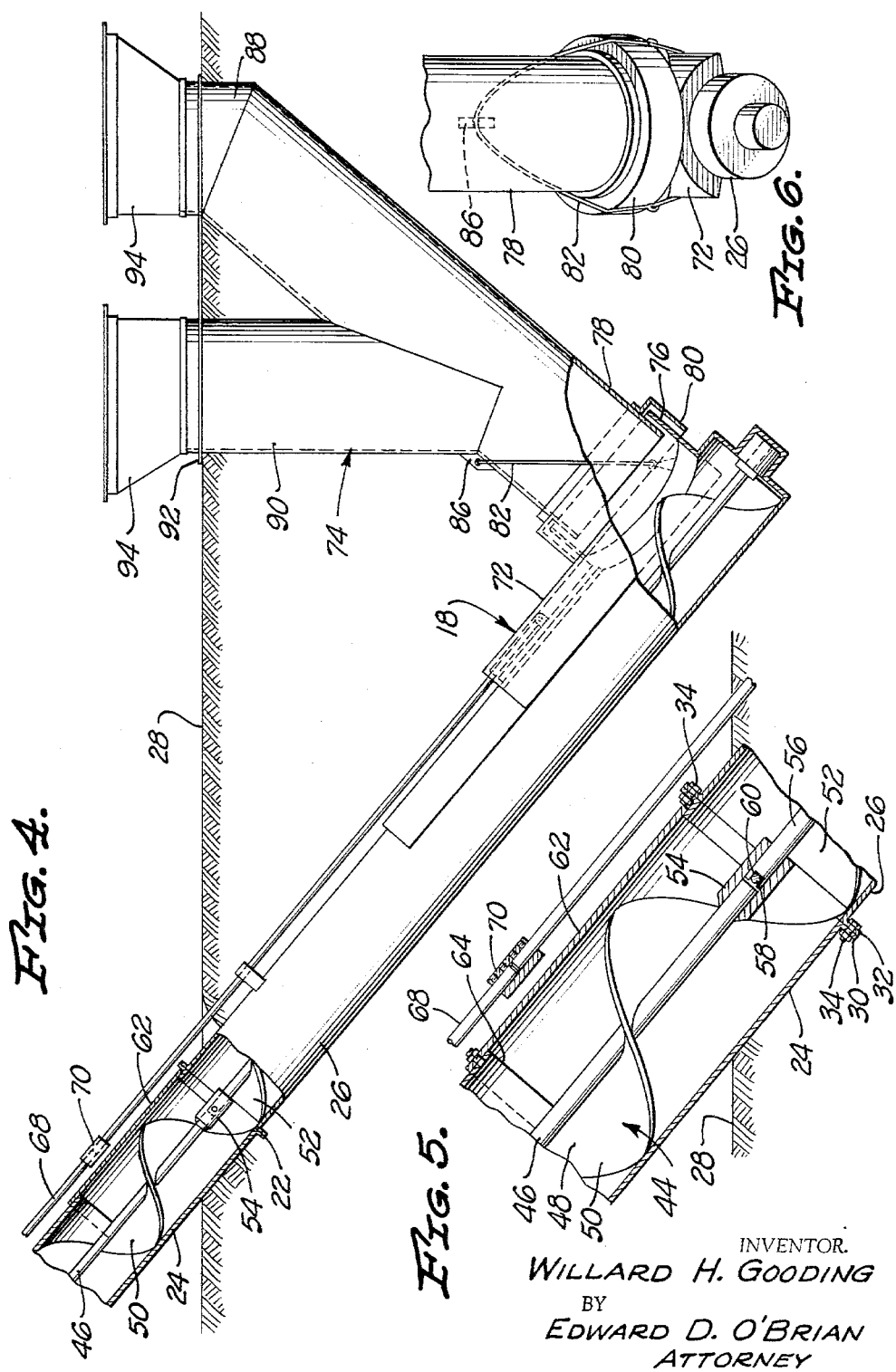

United States Patent Office 3,253,695
Patented May 31, 1966

1

3,253,695
SCREW CONVEYOR
Willard H. Gooding, Los Angeles, Calif., assignor to Western Velo & Cement Specialties, Los Angeles, Calif., a corporation of California
Filed Feb. 28, 1964, Ser. No. 348,202
2 Claims. (Cl. 198—64)

This invention is directed to a screw conveyor having a disconnectable screw and barrel and having a material inlet structure arranged to be flexibly attached to the barrel and sealed with respect thereto.

In the past screw conveyors have been used for elevating finely powdered products, such as finished cement, and have been moved from place to place in accordance with the location of need for conveying and elevating. The need for moving is not entirely consistent with the need for emptying such materials from beneath vehicles such as railroad cars and trucks. Extensive civil engineering work must be done to raise the railroad cars or trucks or to excavate therebeneath and maintain support therefor so that a movable conveyor can be moved into position for unloading and moved away for use elsewhere. Such construction is expensive and often exceeds the cost of a permanent, less complex conveyor installation.

Accordingly it is an object of this invention to provide a conveyor installation wherein a portion of the conveyor is permanently installed at an unloading station beneath a railroad track or truck roadway.

It is another object of this invention to provide an economic and flexible conveyor arrangement whereby a portion of the conveyor equipment remains in position while the remainder thereof is transportable to other locations.

It is another object of this invention to provide a conveyor structure which has a permanently installed portion and a transportable portion disconnectively secured together to act as a single conveyor while in use, and to permit transport to another unloading position of a portion of the conveyor structure, which portion has a major economic value.

Other objects and advantages of this invention will become apparent upon a study of the following portion of the specification, the claims and the drawings in which:

FIG. 1 is a side elevation, partially in section, showing the conveyor of this invention in position for unloading of a railroad car and discharging into a truck;

FIG. 2 is a section taken along the line 2—2 of FIG. 1;

FIG. 3 is a section taken along the line 3—3 of FIG. 1;

FIG. 4 is an enlarged side elevation, with parts broken away, showing a portion of the structure of FIG. 1;

FIG. 5 is a further enlarged section of a portion of the screw conveyor showing the disconnectable joint therein;

FIG. 6 is a partial end elevation showing the juncture between the bottom of the screw conveyor and the bottom of the material inlet structure.

As an aid to understanding this invention it can be stated in essentially summary form that it is directed to a screw conveyor of particular utility to have a portion thereof permanently installed in position below grade for the unloading of vehicles while the more costly portion is disconnectable therefrom and is transportable to other unloading positions. The conveyor structure thus comprises material inlet structure for receiving material to be conveyed from a vehicle and directing it to the screw conveyor. The material inlet structure is flexibly fitted to the conveyor barrel by an interfitting joint which provides proper sealing. The conveyor barrel extends upward and at approximately grade level is disconnectable from the above ground portion. Similarly the screw flight is disconnectable near grade level. This permits the permanently installed equipment to remain in place and permits disconnection and removal of the above ground portion thereof. The above ground portion carries discharge, support and drive mechanism so that the above ground portion is the portion having higher value. Thus the more valuable portion can be transported away and used sequentially in a plurality of different positions, and such saves total capital costs and provides other advantageous features. One of these features is that removal of the above ground portion protects it from the weather, removes the possibly unsightly portion extending high above the ground, and prevents mischievous tampering therewith.

This invention will be understood in greater detail by reference to the following drawings. The screw conveyor of this invention is generally indicated in FIG. 1 at 10. As shown in this figure, the conveyor 10 is arranged to receive the granular contents of a railroad car 12 and discharge this granular material to a truck 14. The screw conveyor 10 has a discharge structure 16 which is disclosed in further detail in patent application Serial No. 258,214, filed February 13, 1963, the entire disclosure of which is incorporated therein by this reference. Furthermore, the screw conveyor 10 has a gate structure 18 which controls entrance of the granular material to the conveyor barrel and screw flight. This gate structure is disclosed in more detail in patent application Serial No. 258,205, filed February 13, 1963, now Patent No. 3,178,009, the entire disclosure of which is incorporated herein by this reference. Furthermore, the entire, general structure of the screw conveyor 10 is described in U.S. Patent No. 3,085,674, granted April 16, 1963, the entire disclosure of which is incorporated herein by this reference.

The screw conveyor 10 comprises a barrel 20 which carries the gate structure 18 on its lower end and the discharge structure 16 at its upper end. The barrel 20 is separable at 22 to provide an upper barrel 24 and a lower barrel 26. The separation 22 is at approximately the level of the top of the ground 28. Any convenient joining method can be used, and as is seen in FIG. 5, flanges 30 and 32, respectively secured to the upper and lower barrels 24 and 26, contain bolt holes in alignment, with appropriate bolts 34 secured by nuts, passing therethrough to hold the upper and lower barrels together. The upper barrel 24 is carried on supporting structure 36 which in turn is carried by ground engaging wheels 38. The supporting structure 36 and wheels 38 serve to physically support the upper barrel 24 in position during the time it is positioned for unloading, as is shown in FIG. 1, and serve to aid in transport of the upper barrel 24 and its associated equipment.

A prime mover 40, shown in FIG. 1, in the form of a gasoline engine, is mounted upon the barrel 24 and is connected by means of drive shaft 42 and appropriate gearing, not shown, to drive a screw flight 44 within the barrel 20. The screw flight 44 comprises a central shaft 46 which carries one or more spiral conveyor flights 48. The screw flight 44 is divided into an upper flight 50 and a lower flight 52 at a separable coupling 54. This separable coupling 54 is generally at the top of the ground 28 and is preferably just above separation 22. Separable coupling 54 is in the form of a hollow cylindrical sleeve secured to the shaft 46 and having a cylindrical opening therein to receive the lower shaft 56 of the lower flight 52. A transverse pin 58 through the coupling sleeve 54 is engaged by the bifurcated end 60 of the shaft 56. By this coupling means the shaft 46 imparts a rotary driving torque to the shaft 56, and yet the shafts remain easily separable. The screw flights associated with each of these shafts are separable at the same point.

A cover 62 is secured over opening 64 in the upper barrel 24 adjacent the point of separation 22. Removal of cover 62 permits access to the juncture of the separable screw flights to aid in joining them.

Gate structure 18 is opened and closed by means of a manually operable handle 66 which axially moves gate operating rod 68. Gate operating rod 68 carries coupling 70 at approximately ground level to permit disconnection thereof when the upper portion of screw conveyor 10 is removed. The gate 18 is shown as open in the drawings, and when closed the coupling 70 is closely adjacent the top of the ground. The gate 18 comprises a curved gate of substantially hemi-cylindrical shell form which embraces the lower barrel 26 and is slidable from a position where it is away to a position where it covers an opening in the lower barrel. The gate is protected by a gate cover 72 which also has an opening therein corresponding to the opening in lower barrel 26. These openings, when the gate is open, permit material to flow from the material inlet structure 74 to the interior of the barrel 26 to permit elevation thereof by means of the screw flights.

Cylindrical inlet duct 76 is mounted on the gate cover 72 and surrounds the opening therein. Inlet duct 76 is of such diameter as to permit entrance therein a cylindrical main feed duct 78. Duct 78 carries a cylindrical skirt 80 which extends around the outside of inlet duct 76. Sufficient space is provided between the ducts 76 and 78 and skirt 80 to permit a degree of angular flexibility of the material inlet structure 74 with respect to lower conveyor barrel 26. Steel wire strap 82 is secured at its terminal ends to the gate cover 72 and passes through an eye 86 on inlet structure 74. Thus, separation of the inlet structure 74 from the lower barrel 26 is prevented, while flexibility is maintained.

Inlet structure 74 comprises cylindrical main feed duct 78 which extends substantially to ground level and at that point has an elbow 88 which extends out of the ground at substantially right angles to the surface thereof. The inlet structure 74 also includes side duct 90 which is secured to the side of duct 78 and is open thereto and extends upwardly at substantially right angles to the ground surface. Duct 90 extends above the ground level to the same height as elbow 88. Both elbow 88 and duct 90 pass through openings in ground plate 92 and are secured thereto. Plate 92 thus spaces and secures elbow 88 and duct 90 with respect to each other. Plate 92 is of such dimension as to be positionable upon railroad ties between the tracks thereon, as is seen in FIGS. 2 and 3. The elbow 88 and duct 90 are spaced along plate 92, and in a direction transversely to railroad tracks, an appropriate distance to cooperate with standard outlets on the bottom of railroad cars and/or trucks. Sleeves 94 are secured to the upper termination of elbow 88 and duct 90 and are of particular configuration to be secured to the bottom of the outlets of the vehicle to be emptied.

It can be seen that this screw conveyor structure is eminently suited for economic installation and use. An appropriate excavation is made beneath and adjacent the position where a vehicle is to be unloaded. As previously noted, this may be beneath a railroad track or beneath a truck roadway. After excavation, the barrel 20 and inlet structure 74 are properly positioned and earth is permanently tamped there around. The ground is finished off as it was before installation, and after the upper portion of the conveyor is separated at 22, little extends above the ground to be visually objectionable or accessible for vandalism. When the below-ground structure is in place and is not in use, appropriate locked covers close the barrel at its separation and close the openings into the inlet structure. When use is desired of the conveyor of this invention, the upper portion of the conveyor is brought into place and is joined to the permanently installed below-ground portion. Since the joining is simple, it is not time consuming. Then, the conveyor structure is ready for use. A vehicle to be unloaded is positioned over the material inlet structure, and the sleeves are secured thereto to prevent loss of material and objectionable dust in the neighborhood. The vehicle to be unloaded is opened, and the granular material is discharged into the material inlet structure. The conveyor screw is started in rotation and the gate is opened to permit a proper amount of material to enter within the barrel. Rotation of the screw flight thus elevates the granular material and it is discharged out of the discharge structure into suitable equipment provided for the receipt thereof. When it is planned that material not be unloaded at that particular site for some time, it becomes desirable to remove the upper portion of the conveyor structure, especially if such upper portion can be used elsewhere. To accomplish this, the conveyor barrels, the gate operating rods and the screw flight are disconnected and the upper portions are removed. Suitable caps are placed over the permanently installed lower barrel and the opening into the inlet structure and are locked in place so that no harm can come from their presence. The site thus remains so that it again can be quickly conditioned for unloading of granular materials.

This invention has been described in its preferred embodiment, and it is clear from this description that it is susceptible to numerous changes and modifications within the skill of the routine engineer without the exercise of the inventive faculty. Accordingly the scope of this invention is defined by the scope of the following claims.

I claim:
1. A conveyor, said conveyor comprising:
   a conveyor barrel, said conveyor barrel being substantially cylindrical and having an inlet opening therein;
   a screw flight positioned within said conveyor barrel and extending from adjacent said inlet opening;
   a closure gate, said closure gate being movably positioned on said conveyor barrel and being adapted to be moved from a first position wherein it covers said inlet opening to a position wherein it uncovers said inlet opening;
   a material inlet structure, said material inlet structure comprising a substantially cylindrical main feed duct and a substantially cylindrical side duct secured thereto, said side duct being adapted to be positioned substantially vertically and said main duct being adapted to be positioned substantially at right angles with respect to said conveyor barrel;
   a collar secured to said conveyor barrel around said inlet opening, said collar extending away from said conveyor barrel and being substantially cylindrical, said main feed duct being positioned within and spaced from said collar, a cylindrical skirt secured to said main feed duct, said cylindrical skirt extending around said collar and being spaced from said collar so that said main feed duct has a limited amount of flexibility with respect to said conveyor barrel.

2. The conveyor structure of claim 1 wherein flexible means connected to said barrel and to said inlet structure prevents separation thereof.

References Cited by the Examiner

UNITED STATES PATENTS

| | | | |
|---|---|---|---|
| 1,954,703 | 4/1934 | Klein | 214—17 |
| 3,085,673 | 4/1963 | Gooding | 198—64 |
| 3,085,674 | 4/1963 | Gooding | 198—64 |
| 3,151,749 | 10/1964 | Long | 214—17 |

HUGO O. SCHULZ, *Primary Examiner.*

WILLIAM B. LA BORDE, SAMUEL F. COLEMAN, *Examiners.*

E. A. SROKA, *Assistant Examiner.*